US012571959B2

(12) United States Patent
Hosseini et al.

(10) Patent No.: US 12,571,959 B2
(45) Date of Patent: Mar. 10, 2026

(54) EMBEDDED PHOTONIC INTEGRATED CIRCUITS

(71) Applicant: Intel Corporation, Santa Clara, CA (US)

(72) Inventors: Kaveh Hosseini, Livermore, CA (US); Ravindranath V. Mahajan, Chandler, AZ (US); Chia-Pin Chiu, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 232 days.

(21) Appl. No.: 18/130,052

(22) Filed: Apr. 3, 2023

(65) Prior Publication Data

US 2024/0329301 A1 Oct. 3, 2024

(51) Int. Cl.
*G02B 6/12* (2006.01)

(52) U.S. Cl.
CPC ................................. *G02B 6/12004* (2013.01)

(58) Field of Classification Search
CPC ........................ G02B 6/12002; G02B 6/12004
See application file for complete search history.

(56) References Cited

U.S. PATENT DOCUMENTS

| | | | | | |
|---|---|---|---|---|---|
| 5,054,870 | A * | 10/1991 | Losch | ....................... | G02B 6/43 |
| | | | | | 250/227.24 |
| 6,477,286 | B1 * | 11/2002 | Ouchi | ....................... | G02B 6/10 |
| | | | | | 257/433 |

| | | | | | |
|---|---|---|---|---|---|
| 6,768,826 | B2 * | 7/2004 | Ayadi | .................... | G02B 6/4249 |
| | | | | | 385/14 |
| 7,539,366 | B1 * | 5/2009 | Baks | ..................... | G02B 6/4201 |
| | | | | | 385/33 |
| 9,715,064 | B1 * | 7/2017 | Gambino | ................. | G02B 6/43 |
| 2004/0218372 | A1 * | 11/2004 | Hamasaki | ........... | H05K 1/0263 |
| | | | | | 361/767 |
| 2007/0007641 | A1 | 1/2007 | Lee et al. | | |
| 2007/0280585 | A1 * | 12/2007 | Warashina | ............... | G02B 6/43 |
| | | | | | 385/14 |
| 2009/0169219 | A1 * | 7/2009 | Nakano | ..................... | G02B 6/43 |
| | | | | | 398/200 |
| 2010/0081236 | A1 * | 4/2010 | Yang | ........................ | H01L 24/94 |
| | | | | | 257/E21.511 |
| 2012/0063718 | A1 * | 3/2012 | Steijer | .................. | G02B 6/4269 |
| | | | | | 385/14 |
| 2013/0032390 | A1 * | 2/2013 | Hu | ..................... | H01L 23/49833 |
| | | | | | 174/266 |
| 2013/0330035 | A1 * | 12/2013 | Shin | ...................... | G02B 6/4214 |
| | | | | | 385/14 |
| 2015/0145086 | A1 * | 5/2015 | Rokuhara | ............ | G02B 6/4206 |
| | | | | | 257/432 |
| 2017/0287872 | A1 * | 10/2017 | Shen | ...................... | H01L 23/367 |
| 2018/0026008 | A1 | 1/2018 | Jeng et al. | | |
| 2018/0156972 | A1 * | 6/2018 | Kainuma | ............... | H05K 1/183 |
| 2019/0326266 | A1 * | 10/2019 | Traverso | ........... | H01L 23/49838 |
| 2020/0174206 | A1 * | 6/2020 | Perminjat | ................ | G02B 6/43 |

(Continued)

*Primary Examiner* — Michael Stahl

(74) *Attorney, Agent, or Firm* — Akona IP PC

(57) ABSTRACT

A substrate for a multi-chip package includes at least one photonic integrated circuit (PIC) interposer mounted in a cavity in a first major surface. Each PIC interposer is configured to electrically connect with, or optically couple to, a plurality of integrated circuit devices. The substrate further includes at least one optical coupler that is optically coupled to the PIC interposer.

14 Claims, 12 Drawing Sheets

(56)         References Cited

U.S. PATENT DOCUMENTS

| | | |
|---|---|---|
| 2020/0373260 A1 | 11/2020 | Hovis et al. |
| 2021/0271020 A1* | 9/2021 | Islam .................... H01L 25/105 |
| 2021/0271037 A1* | 9/2021 | Brusberg ............. G02B 6/4228 |
| 2022/0189916 A1* | 6/2022 | Jung ....................... H01L 24/73 |
| 2022/0199600 A1 | 6/2022 | Zhang et al. |
| 2022/0399278 A1 | 12/2022 | Marin |
| 2023/0080454 A1* | 3/2023 | Pietambaram ....... G02B 6/4274 |
| | | 385/14 |
| 2023/0091050 A1* | 3/2023 | Zhang ..................... G02B 6/43 |
| | | 385/31 |
| 2023/0092060 A1* | 3/2023 | Moret ...................... G02B 6/43 |
| | | 385/14 |
| 2023/0204879 A1* | 6/2023 | Kim ..................... G02B 6/4249 |
| | | 385/33 |
| 2023/0317694 A1* | 10/2023 | Libsch ................. H01L 25/167 |

\* cited by examiner

EMBEDDED PHOTONIC INTEGRATED CIRCUITS

TECHNICAL FIELD

Embodiments described herein generally relate to substrates for mounting multiple integrated circuit devices. The substrates provide optical interconnects between the integrated circuit devices mounted thereon, as well as optical interconnects to other integrated circuit devices and substrates.

BACKGROUND

An integrated circuit device (IC), which may also be referred to as a die, chip, microchip or microelectronic circuit, is a semiconductor wafer on which thousands or millions of tiny resistors, capacitors, diodes and transistors are fabricated. In some examples, an IC can function as an amplifier, oscillator, timer, counter, logic gate, computer memory, microcontroller or microprocessor.

Circuit boards for mounting ICs have been made from organic materials such as, for example, glass fiber reinforced epoxy or phenolic resins. To achieve increasingly aggressive input/output (I/O) speed targets, some integrated circuit packages utilize optical interconnect technology. However, optically interconnecting multiple ICs on a single circuit board has proved to be difficult and expensive.

Circuit board designs and assembly techniques are needed to provide substrates suitable for accurate and reproducible mounting of ever-increasing numbers of ICs at an increasingly small pitch.

BRIEF DESCRIPTION OF THE DRAWINGS

Like symbols in the figures indicate like elements.

DESCRIPTION OF EMBODIMENTS

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figures 1A, 1B, 1C:
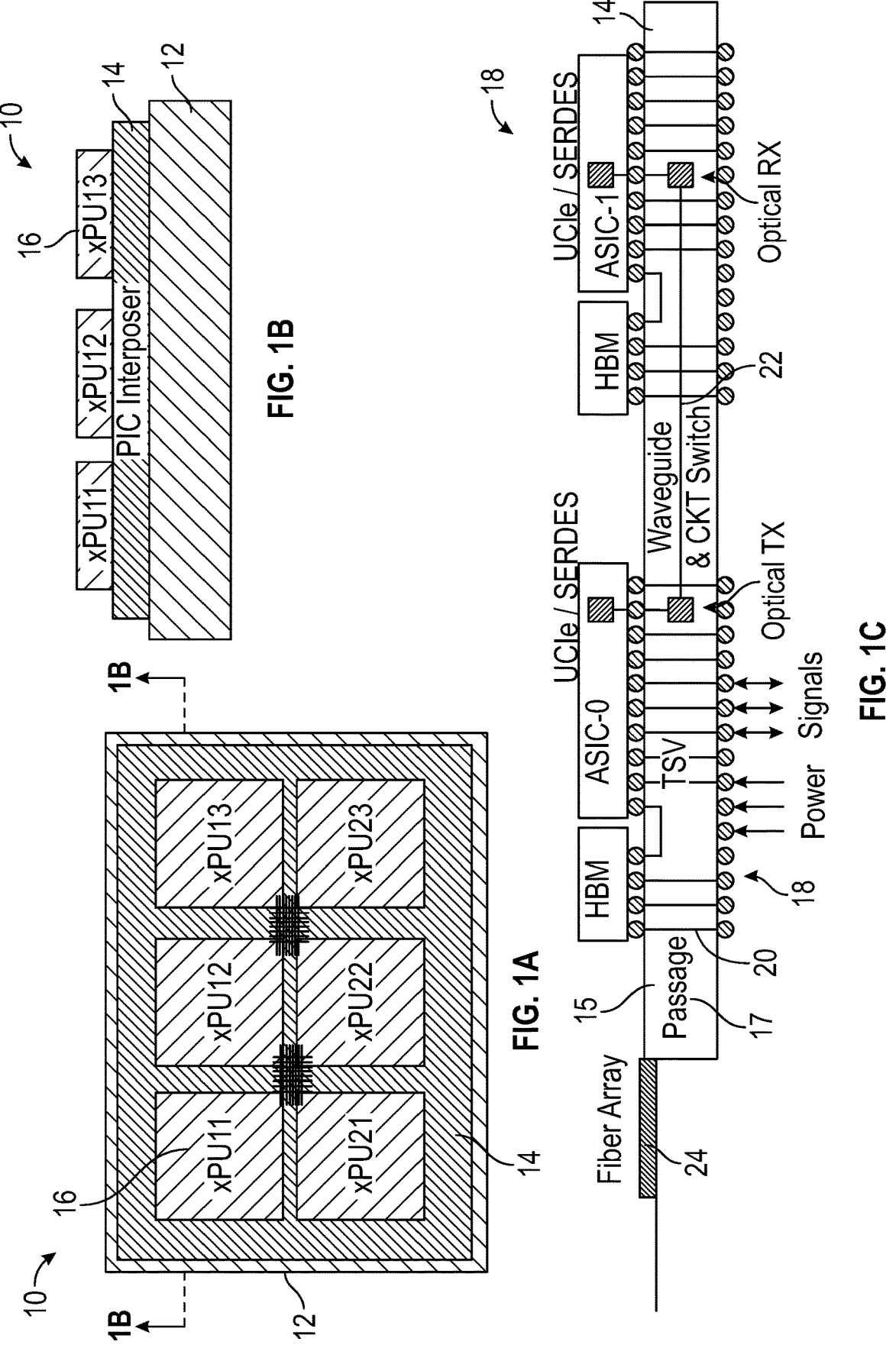
FIG. 1A is a schematic overhead view of a multi-chip package including a PIC interposer.
FIG. 1B is a schematic cross-sectional view of the multi-chip package of FIG. 1A.
FIG. 1C is a schematic cross-sectional view of the PIC interposer of the multi-chip package of FIGS. 1A-1B.

In one example, which is shown schematically in FIGS. 1A-1C, a multi-chip package 10 includes a glass fiber substrate 12 having mounted thereon a silicon-based photonic integrated circuit (PIC) interposer 14. A plurality of ICs 16 are mounted on the PIC interposer 14. As shown schematically in FIG. 1C, the PIC interposer 14 includes opposed major surfaces 15, 17, each including solder ball arrays 18. The solder ball arrays 18 may be configured for electrical interconnection to the substrate 12 and the ICs 16, and the arrangements shown in FIG. 1C are merely provided as an example. The PIC interposer 14 includes electrically conductive vias 20 to electrically interconnect components on the substrate 12 to the ICs 16. The PIC interposer 14 can further include internal optical waveguides 22 to allow optical communication between selected ICs 16, and may also be attachable to a photonic circuit including an optical fiber array 24 for optical communication with other multi-chip packages, ICs, or PICs.

The silicon-based PIC interposer 14 shown in FIGS. 1A-1C covers the entire area beneath the ICs 16. The number of ICs that can be packaged on a single wafer is set by lithography equipment, which defines the largest size that can be exposed without errors resulting from distortion or imperfections in a mask. To increase the size of the interposer 14, or to mount ever larger numbers of ICs 16 thereon, would likely require multiple adjacent exposures using a different mask set, all of which require precise alignment.

The number and size of ICs that can be mounted on the PIC interposer 14 is thus limited by reticle size, which limits the amount of chip surface area that can be exposed using a single mask.

In addition, as the size of the silicon-based PIC interposer 14 increases, the coefficient of thermal expansion (CTE) mismatch between the PIC interposer 14 and the underlying organic substrate 12 can result in warping and distortion of the package 10 following repeated thermal cycling. Optical waveguides can be difficult to form in silicon materials like the PIC interposer 14, so the PIC interposer 14 can limit available waveguide designs to provide optical communication between the ICs 16 mounted thereon, or between the package 10 and other multi-chip packages or semiconductor components.

In one aspect, the present disclosure provides a multi-chip package with a one or a plurality of optically and electrically interconnected photonic integrated circuit (PIC) interposers. The PIC interposers can be organized on a selected region of a supporting substrate like tiles, and are scalable to interconnect multiple ICs optically and electrically. The multi-chip package including the PIC interposers also provides optical data outputs for package-to-package interconnects.

The PIC interposers in the multi-chip package can reside in or on a glass or an organic substrate. Optical waveguides may be readily formed in a glass substrate for optically interconnecting the tiled PICs, and electrically conductive through vias (TGV) may be formed in the glass for electrically connecting the ICs thereon to each other or to an underlying circuit board or other electronic device.

The PIC interposers of the present disclosure this provide a scalable architecture that can be configured to increase the number of optically and electrically interconnected ICs within a multi-chip package. When placed on or within a glass substrate, low-loss optical waveguides may be formed in the glass, which can greatly simplify assembly. Forming waveguides in the glass substrate can be much easier than forming waveguides within the silicon PIC interposer itself, which requires a more expensive wafer patterning process.

Figure 2A:
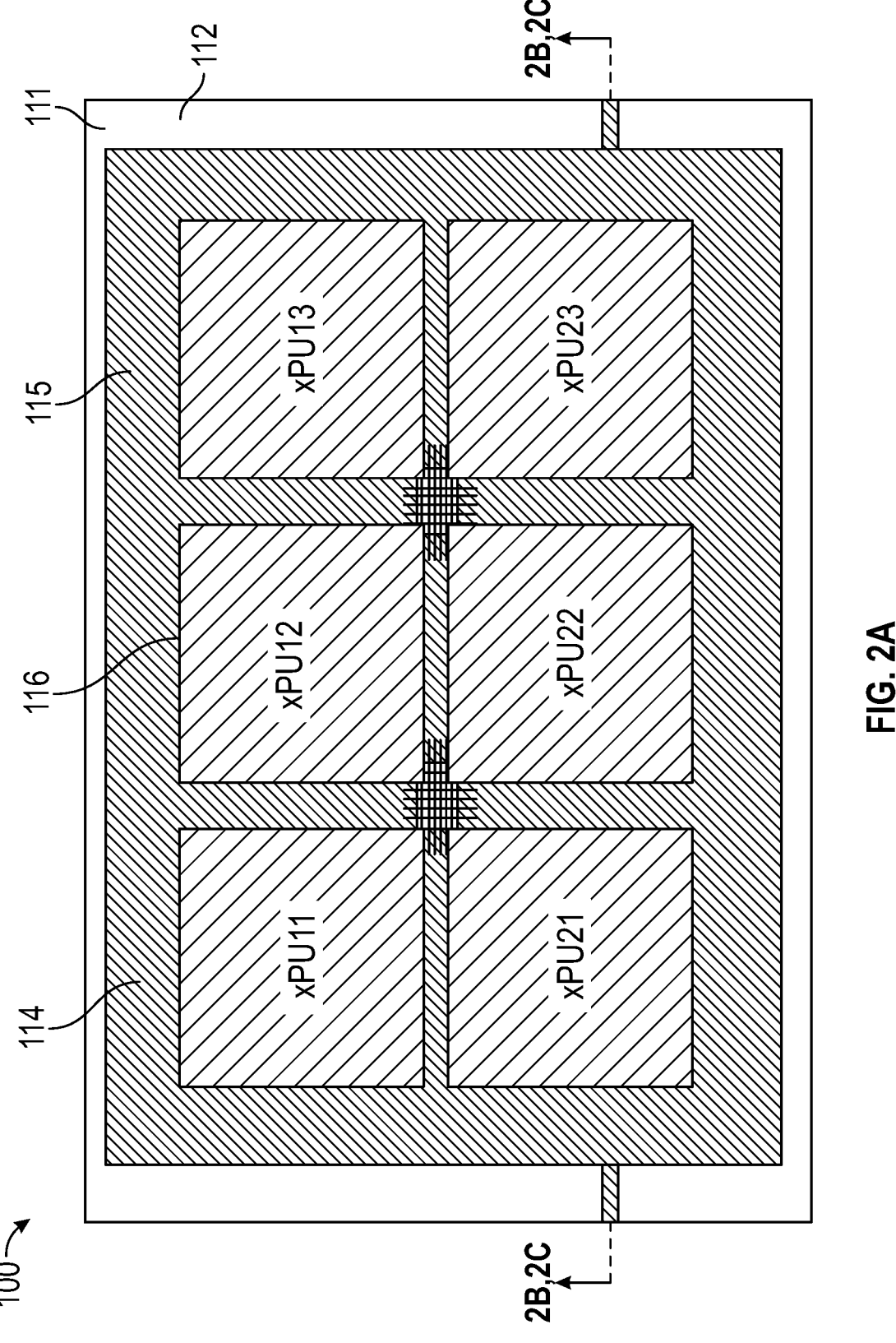
FIG. 2A is a schematic, overhead view of a multi-chip package on a glass substrate.
Figures 2B, 2C:
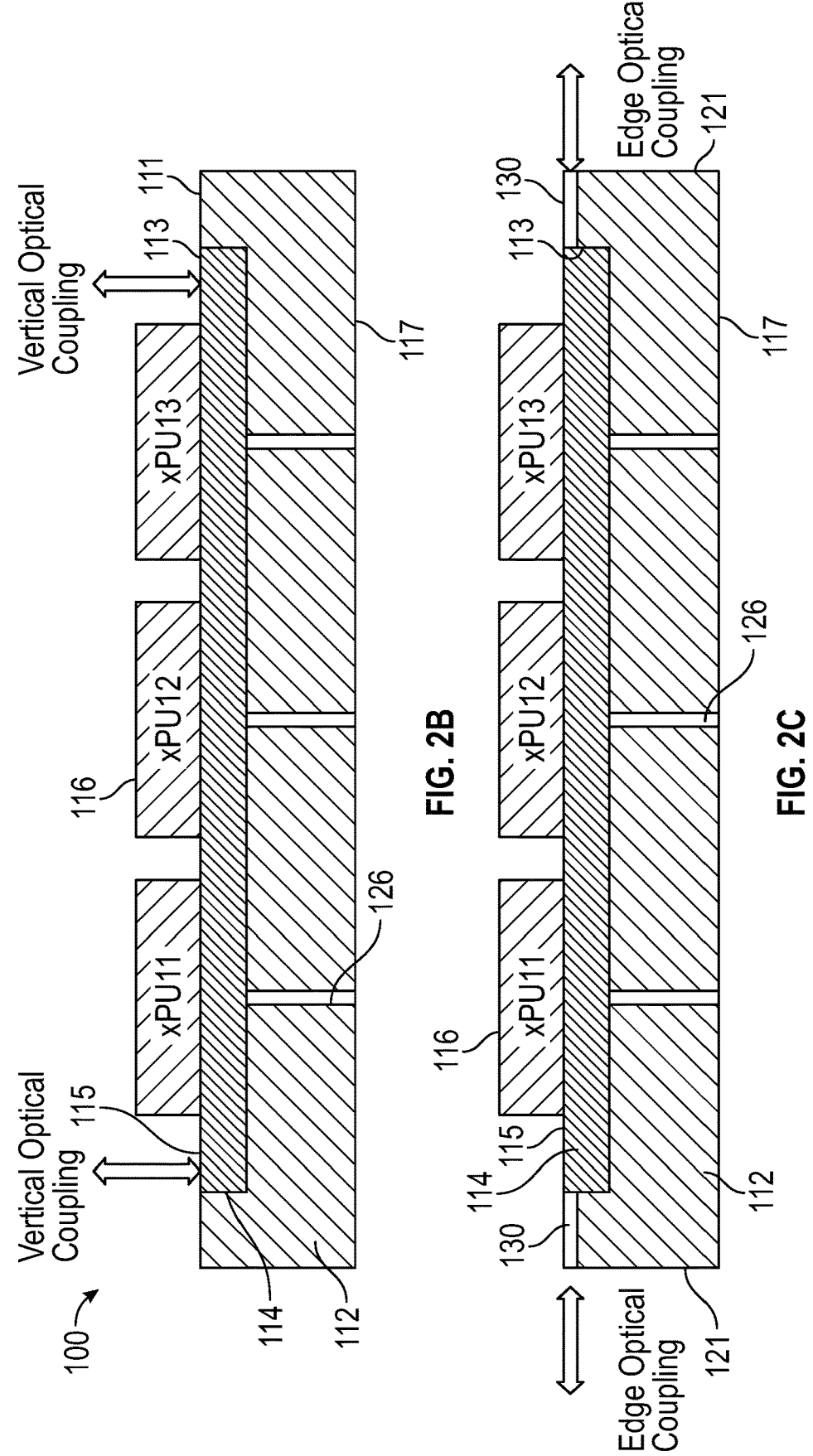
FIGS. 2B-2C are schematic cross-sectional views of the multi-chip package of FIG. 2A taken along a line A-A of FIG. 2A.

Referring now to FIGS. 2A-2C, in one embodiment the multi-chip package 100 of the present disclosure includes a glass substrate 112 with a substantially planar first major surface 111. In the present application, the term "glass" refers to an amorphous solid. Examples of glass materials that may be used with the described embodiments include pure silica (e.g., approximately 100% $SiO_2$), soda-lime glass, boro-silicate glass, and alumo-silicate glass. However, the disclosed embodiments are not limited to silica-based glass compositions, and glasses having alternative base materials (e.g., fluoride glasses, phosphate glasses, chalcogen glasses, etc.) may also be used.

Further, any combination of other materials and additives may be combined with silica (or other base material) to form a glass panel having desired physical properties. Examples of these additives include not only calcium carbonate (e.g., lime) and sodium carbonate (e.g., soda), but also magnesium, calcium, manganese, aluminum, lead, boron, iron, chromium, potassium, sulfur, and antimony, as well as carbonates and/or oxides of these and other elements. These glasses and additives are but a few examples of the many types of materials and material combinations that may find application with the disclosed embodiments. In addition, the glass panel may optionally include surface treatments and/or coatings to improve strength and/or durability, and a glass body suitable for use in the embodiments described herein may also be annealed to lower internal stresses.

Generally, as used herein, the term "glass" does not refer to organic polymer materials, which may be amorphous in solid form. However, it should be understood that a glass according to some embodiments may include carbon as one of the material's constituents. For example, soda-lime glass, as well as numerous variations of this glass type, include carbon.

A PIC interposer 114 is mounted in a suitably dimensioned cavity 113 within the bounds of the first major surface 111 of the glass substrate 112. In this application, the term photonic integrated circuit device (PIC) refers to any silicon-based integrated circuit device that includes an optical component. In some examples, which are not intended to be limiting, photonic integrated circuit devices can include EICs, PICs, logic dies, combinations thereof, or stacks or modules including one or more of these components.

In the example of FIGS. 2A-2C, the cavity 113 has a depth sufficient such that an exposed mounting surface 115 of the PIC interposer 114 is substantially coplanar with respect to the first major surface 111 of the glass substrate 112. The PIC interposer 114 may be mounted in the cavity 113 using any known technique such as, for example, with an optically clear adhesive.

As shown schematically in FIGS. 2A-2C, a plurality of integrated circuit devices (ICs) 116 are mounted on the mounting surface 115, and the mounting surface 115 covers the entire area under the ICs 116. The ICs 116 may be electrically interconnected with the PIC interposer 114 using any suitable technique, and some examples flip chip bonding may be used. The undersides of the ICs 116 include arrays of solder bumps that mate with corresponding arrays of solder bumps on the mounting surface 115 of the PIC interposer 114 (not shown in FIGS. 2A-2C). Once the corresponding arrays of solder bumps are attached, space between the ICs 116 and the mounting surface 115 may optionally be filled with an underfill material such as an epoxy resin. The ICs 116 may be the same or different, and can include semiconductor devices such as an amplifier, oscillator, timer, counter, logic gate, computer memory, microcontroller or microprocessor, and the like, and combinations thereof.

In some examples, the glass substrate 112 may optionally include through glass vias (TGV) 126 that extend along a direction normal to a plane of the first major surface 111 and terminate at a second major surface 117. The through glass vias 126 are filled with a conductive material and provide electrically conductive pathways through the glass substrate 112.

Through glass vias (TGV) in the glass substrate 112 can be formed using laser treatment of a glass core followed by etching to form apertures through the glass core. Seeds are then deposited in the apertures using, for example, a sputtering process, followed by metal plating to form conductive passages through the glass core. In some examples, glass panels are irradiated with a laser to form a patterned via array, and the glass panels are subsequently etched to form vias extending from a first major surface to an opposed second major surface thereof. The etched vias are seeded with a metal or metal alloy and then plated to form electrically conductive pillars.

Referring again to FIGS. 2A-2C, in some examples the glass substrate 112 includes optical waveguides 130 that provide optical interconnection between the PIC interposer 114 and another optical component. As shown schematically in FIGS. 2A-2C, in some examples the optical waveguides 130 extend along a direction substantially parallel to a plane of the major surface 111 of the glass substrate 112, and are formed within the glass substrate 112. In some examples, the optical waveguides 130 extend to an edge 121 of the glass substrate 112, and can provide edge optical coupling between the multi-chip package 100 and another optical component such as, for example, a detector, an array of optical fibers, or another multi-chip package (not shown in FIGS. 2A-2C).

In some examples, the PIC interposer 114 may optionally include optical waveguides or other components (not shown in FIGS. 2A-2C) to provide vertical optical coupling from the PIC interposer 214 to another optical component such as, for example, a detector, an array of optical fibers, or another multi-chip package. As shown in FIG. 2B, the term vertical optical coupling refers to coupling along a direction substantially normal to a plane of the first major surface 111 of the glass substrate 112.

While not shown in FIGS. 2A-2C, in some examples the glass substrate 112 may optionally include solder balls or other connectors on the second major surface thereof to provide electrical interconnection with another semiconductor component, circuit board, or multi-chip package.

Figures 2D, 2E, 2F:
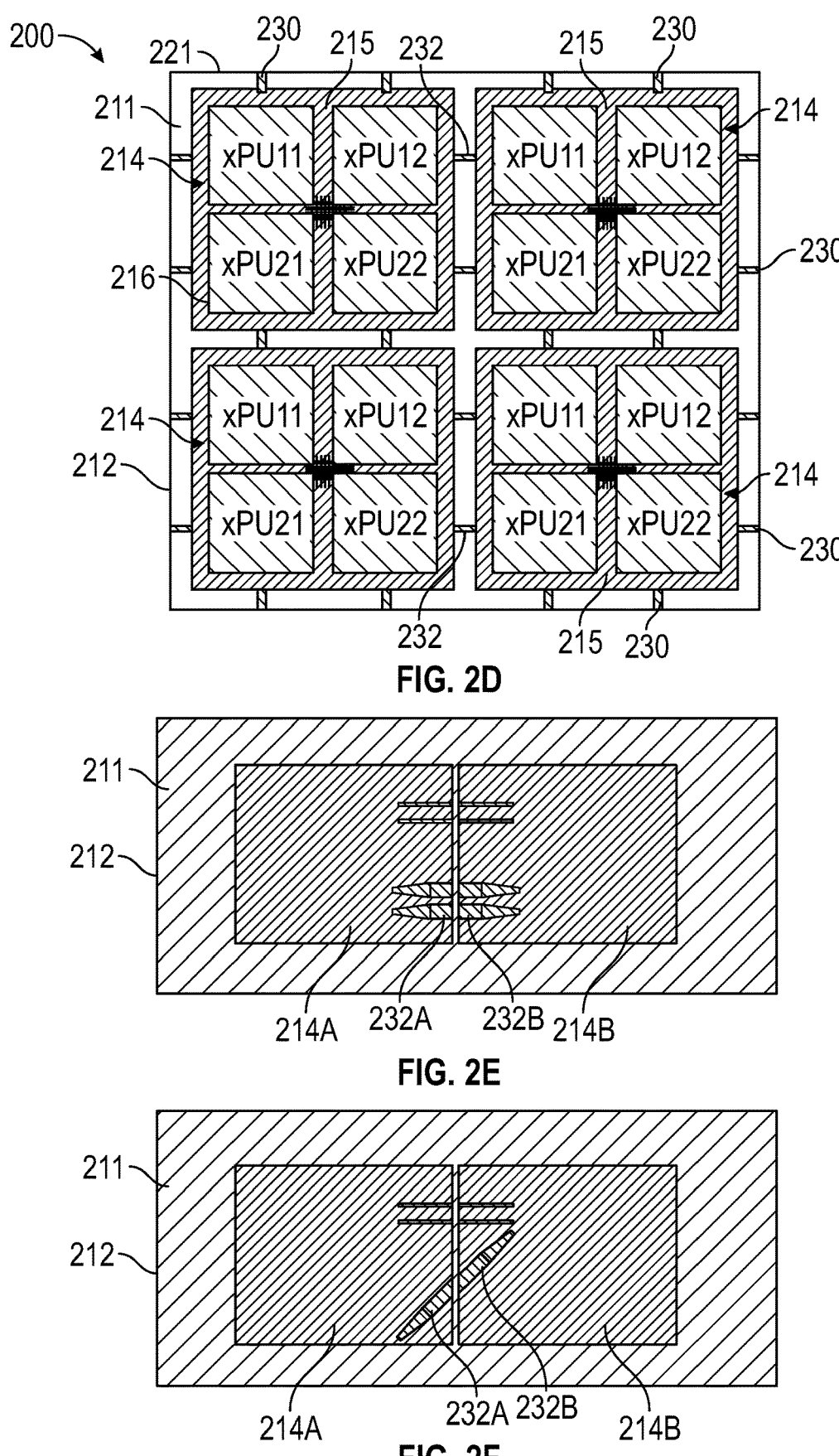
FIG. 2D is a schematic overhead view showing multiple multi-chip packages of FIGS. 2A-2C on a single glass substrate.
FIGS. 2E-2F are schematic overhead views showing edge couplers configured to optically interconnect the PIC interposers in the multi-chip package of FIGS. 2A-2C.

Referring now to FIG. 2D, in another example a multi-chip package 200 includes a glass substrate 212 having mounted thereon a plurality of PIC interposers 214. Each of the PIC interposers 214 resides in a suitable cavity (not shown in FIG. 2D) in a first major surface 211 of the glass substrate 212. As shown schematically in FIGS. 2D, a plurality of integrated circuit devices (ICs) 216 are mounted on mounting surface 215 of each PIC interposer 214, and the mounting surface 215 on each PIC interposer 214 covers the entire area under the ICs 216. The ICs 216 may be electrically interconnected with the PIC interposer 214 using, for example, flip chip bonding. The ICs 216 on each PIC interposer 214 may be the same or different, and can include semiconductor devices such as an amplifier, oscillator, timer, counter, logic gate, computer memory, microcontroller or microprocessor, and the like, and combinations thereof.

The glass substrate 212 includes at least one optical waveguide 230 that provides optical interconnection between the PIC interposers 214 and another optical component. As shown schematically in FIG. 2D, in some examples the optical waveguides 230 extend along a direction substantially parallel to a plane of the major surface 211 of the glass substrate 212, and are formed within the glass substrate 212. The optical waveguides 130 extend to an edge 221 of the glass substrate 212, and can provide edge optical coupling of the multi-chip package 200 to another optical component such as, for example, a detector, an array of optical fibers, or another multi-chip package (not shown in FIG. 2D).

The glass substrate 212 further includes optical waveguides 232 configured to provide optical coupling between the PIC interposers 214. In the example of FIG. 2D, the optical waveguides 232 extend along a direction substantially parallel to a plane of the major surface 211 of the glass substrate 212, and are formed within the glass substrate 212.

In another example shown schematically in FIGS. 2E-2F, adjacent PIC interposers 214A, 214B can be aligned on the surface 211 of the glass substrate 212. Edge couplers 232A, 232B formed within each of the PIC interposers 214A, 214B may be used to optically couple the PIC interposers 214A, 214B. As shown schematically in FIGS. 2E-2F, the edge couplers may be aligned substantially parallel with respect to an edge of the PIC interposers 214, 214B (FIG. 2E), or may be aligned at an angle with respect to an edge of the PIC interposers 214A, 214B (FIG. 2F). The edge couplers 232A, 232B may optionally have a wide opening to reduce the sensitivity to misalignment, which can reduce optical power coupling loss.

In some examples, one or more of the PIC interposers 214 may optionally include optical waveguides or other components (not shown in FIG. 2D) to provide vertical optical coupling to another optical component such as, for example, a detector, an array of optical fibers, or another multi-chip package.

Figure 3A:
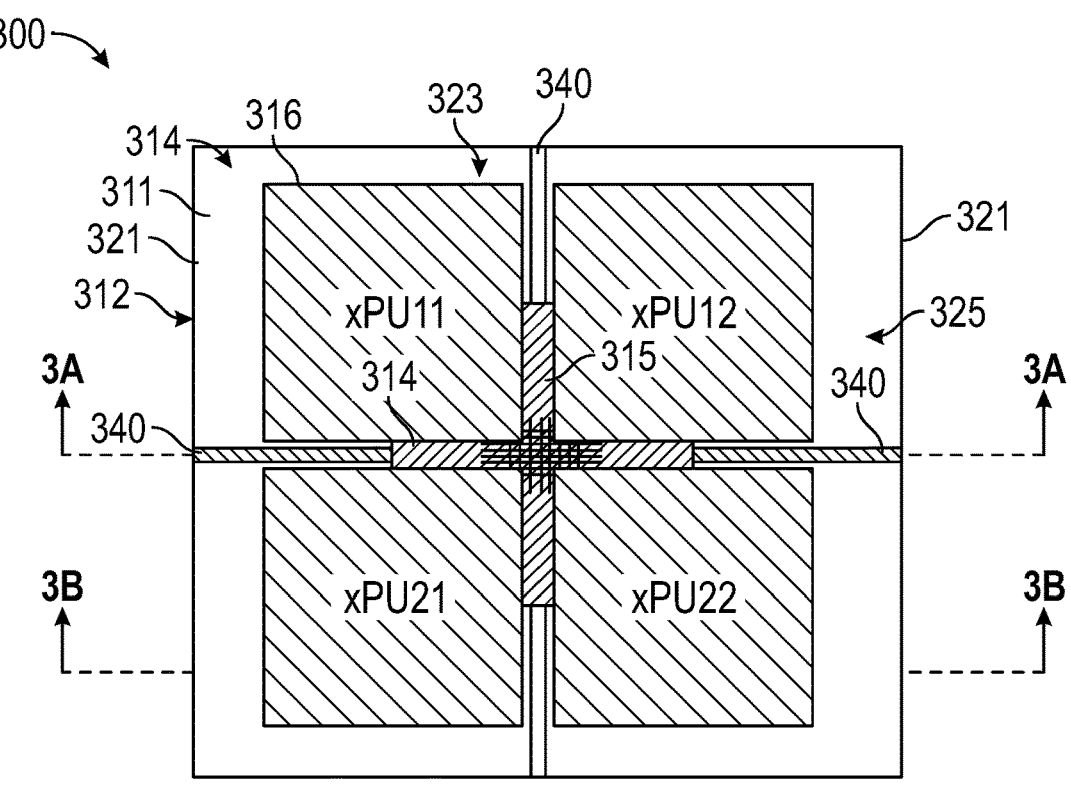
FIG. 3A is a schematic, overhead view of a multi-chip package on a substrate including a single PIC interposer overlain by portions of multiple ICs.
Figure 3B:
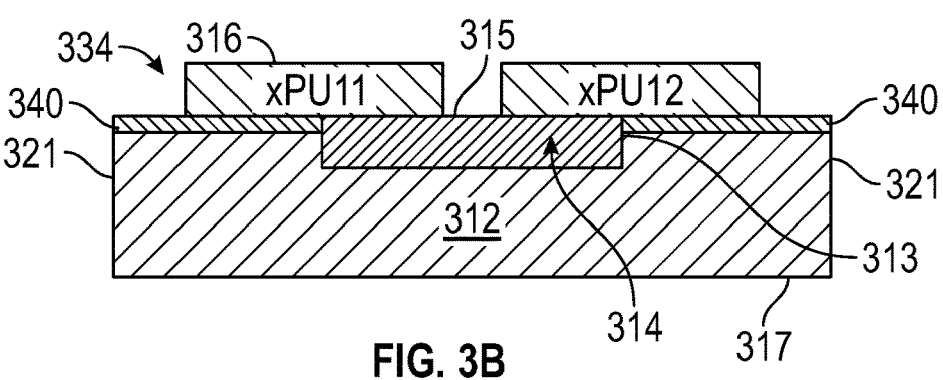
FIG. 3B is a schematic cross-sectional view of the multi-chip package of FIG. 3A taken along a line A-A of FIG. 3A.
Figure 3C:
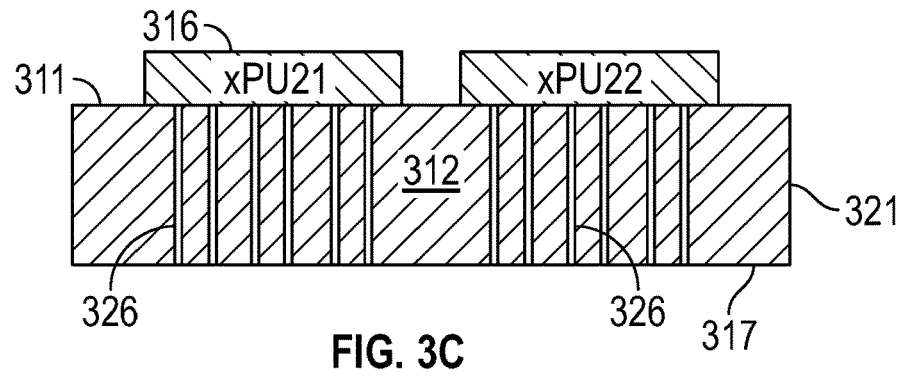
FIG. 3C is a schematic cross-sectional view of the multi-chip package of FIG. 3A taken along a line B-B of FIG. 3A.

In another embodiment shown in FIGS. 3A-3C, a multi-chip package 300 includes a substrate 312, which may be glass or an organic material such as, for example, glass fiber reinforced epoxy resin. The substrate 312 includes a first major surface 311, and an opposed second major surface 317. The first major surface 311 includes a central region 323 circumscribed by a peripheral region 325. A PIC interposer 314 is mounted in a cavity 313 in the central region 323 such that a mounting surface 315 on the PIC interposer 314 is substantially coplanar with respect to the first major surface 311 of the substrate 312.

An array 334 of ICs 316 is mounted on the first major surface 311 of the substrate 312 such that only a portion of each IC 316 overlies the mounting surface 315 of the PIC interposer 314. In other words, the PIC interposer 314 is centrally mounted such that only a part of each IC 316 overlies the mounting surface 315, while the remainder of the IC 316 rests on, or is attached to solder bumps on, the first major surface 311 of the substrate 312. Each of the ICs 316 (xPU11, xPU12, xPU21, xPU22) includes an array of solder bumps (not shown in FIGS. 3A-3C) configured to mount to a corresponding array of solder bumps on a region of the mounting surface 315 of the PIC interposer 314 or the first major surface 311 using flip-chip mounting techniques. The arrays of solder bumps on each of the ICs 316 may be the same or different, depending on the IC size and type. The solder bumps provide electrical interconnection between the ICs 316 and the PIC interposer 314. In some examples, the PIC interposer may further include optical couplers to optically couple with the ICs 316.

As shown in FIGS. 3A and 3B (which is a view along line A-A) in FIG. 3A), the substrate 312 further includes optical connectors 340, which extend from the central region 323 to an edge 321 of the substrate 312. In some examples, the optical connectors 340 may include optical waveguides formed within a glass substrate 312. In another example, the optical connectors 340 may include on-cavity PICs on an organic substrate 312.

The optical connectors 340 provide optical interconnection between the PIC interposer 314 and another optical component. As shown schematically in FIG. 3A, in some examples the optical connectors 340 extend along a direction substantially parallel to a plane of the major surface 311 of the substrate 312, and extend to an edge 321 of the substrate 312. The optical connectors 340 provide edge optical coupling of the multi-chip package 300 to another optical component such as, for example, a detector, an array of optical fibers, or another multi-chip package (not shown in FIGS. 3A-3C).

In some examples, the PIC interposer 314 may optionally include optical waveguides or other components (not shown in FIGS. 3A-3C) to provide vertical optical coupling to another optical component such as, for example, a detector, an array of optical fibers, or another multi-chip package.

As shown in FIG. 3C, which is a view taken along the line B-B in FIG. 3A, the central region 323 or the peripheral region 325 of the substrate 312 may include electrically conductive vias 326 that extend along a direction normal to a plane of the first major surface 311 and terminate at the second major surface 317. In some examples, the vias 326 are through glass vias (TGV) 326 filled with a conductive material, and in other examples the vias 326 are electrically conductive channels in an organic substrate material. The vias 326 provide electrically conductive pathways through the substrate 312 to form interconnections between the ICs 316 and another semiconductor component, circuit board, or the like. In some examples, the vias 326 include solder bumps (not shown in FIG. 3C) along the second major surface 317 of the substrate 312 to provide electrical interconnection with another semiconductor component, circuit board, or the like.

Referring now to FIGS. 4A-4D, in another embodiment a multi-chip package 400 includes a glass substrate 412. The glass substrate 412 includes a first major surface 411, and an opposed second major surface 417. The first major surface 411 includes a central region 423 circumscribed by a peripheral region 425. A tiled array 436 of four PIC interposers 414A-414D is arranged in the central region 423, each mounted in a respective cavity 413A-413D such that a mounting surface 415A-415D on each PIC interposer 414A-414D is substantially coplanar with respect to the first major surface 411 of the substrate 412.

Figure 4A:
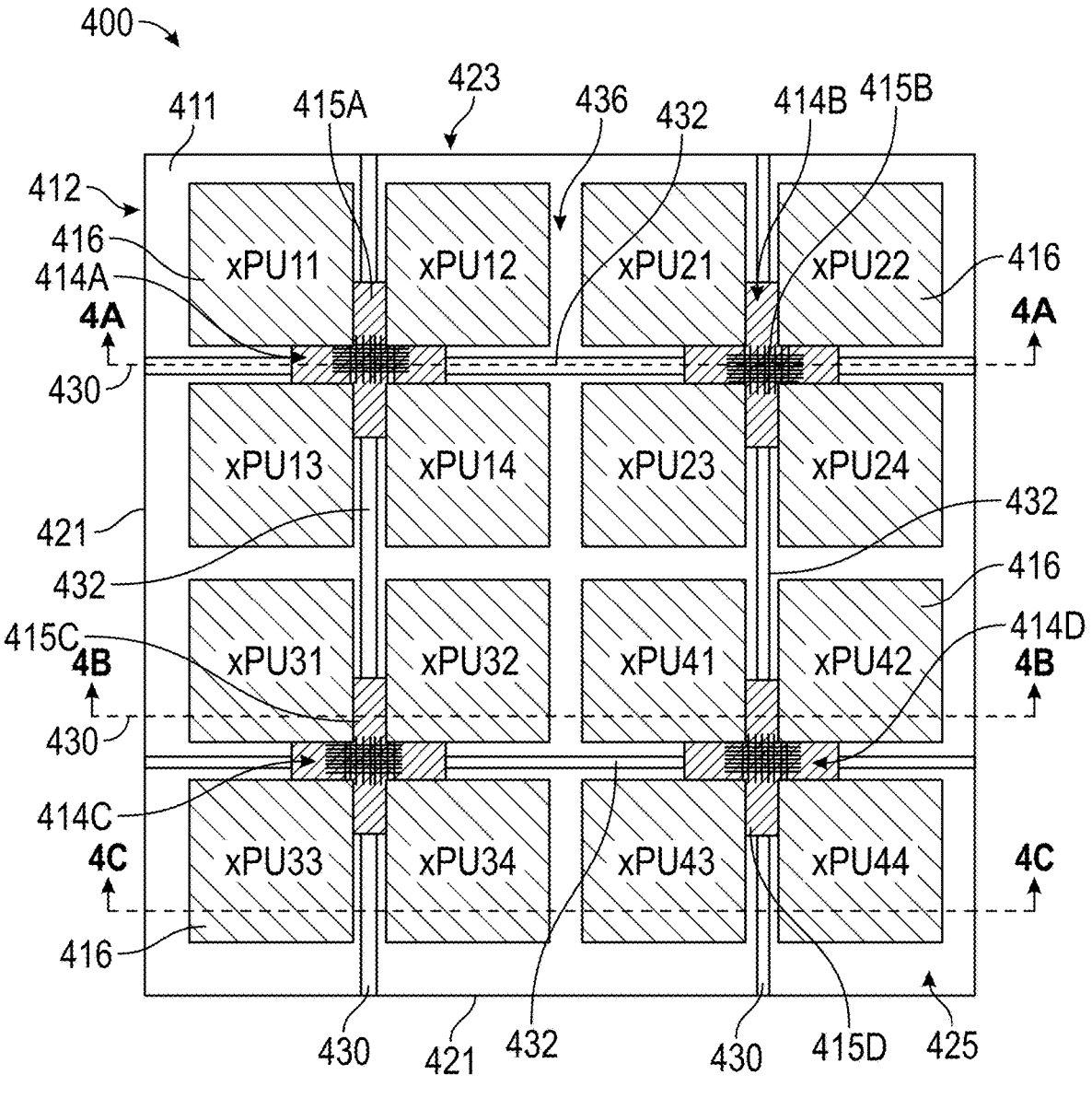
FIG. 4A is a schematic, overhead view of a multi-chip package on a substrate including multiple PIC interposers each overlain by portions of multiple ICs.
Figure 4B:
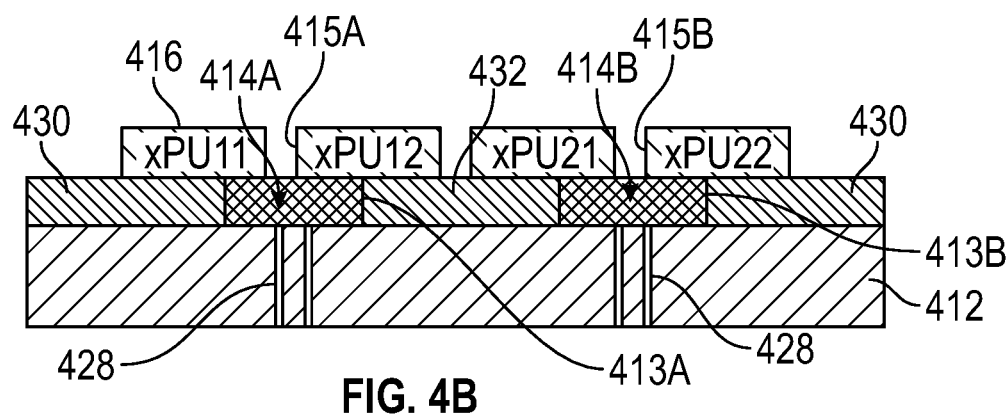
FIG. 4B is a schematic cross-sectional view of the multi-chip package of FIG. 4A taken along a line A-A of FIG. 4A.
Figure 4C:
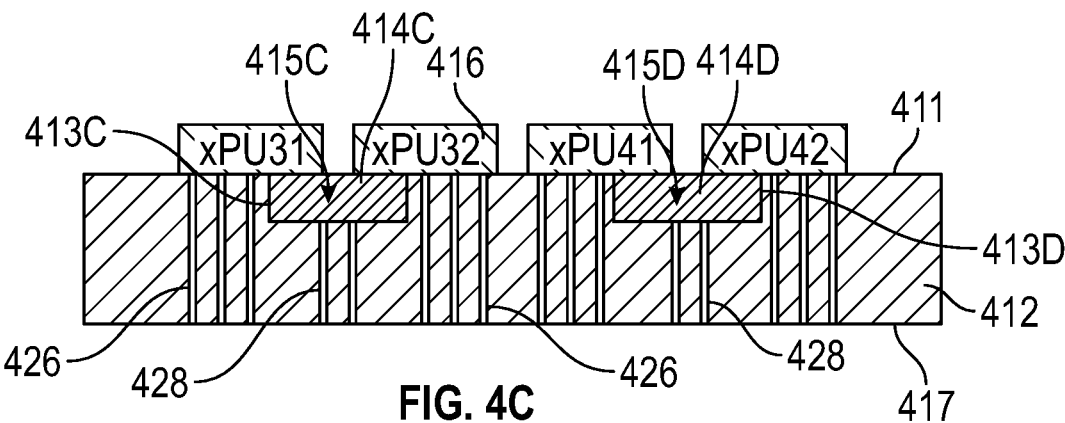
FIG. 4C is a schematic cross-sectional view of the multi-chip package of FIG. 4A taken along a line B-B of FIG. 4A.

In the example of FIGS. 4A-4C, which is not intended to be limiting, each PIC interposer 414A-414D is mounted to four ICs 416 such that a portion of each IC 416 overlies the respective mounting surface 415A-415D of the PIC interposers 414A-414D, while the remainder rests on, or connects to, the first major surface 411 of the substrate 412.

In the example of FIGS. 4A-4C, the PIC interposer 414A is electrically connected to four ICs 416 (xPU11, xPU12, xPU13, xPU14), the PIC interposer 414B is electrically connected to four ICs 416 (xPU21, xPU22, xPU23, xPU24), the PIC interposer 414C is electrically connected to four ICs 416 (xPU31, xPU32, xPU33, xPU34) and the PIC interposer 414D is electrically connected to four ICs 416 (xPU41, xPU42, xPU43, xPU44). Each of the ICs 416 includes an array of solder bumps (not shown in FIGS. 4A-4D) configured to mount to a corresponding array of solder bumps on a region of the mounting surface 415A-415D of the respective PIC interposer 414A-414D using flip-chip mounting techniques.

The arrays of solder bumps on each of the ICs 416 may be the same or different, depending on the IC size and type. The solder bumps provide electrical interconnection between the ICs 416 and the PIC interposers 414A-414D. In some examples, the PIC interposers 414A-414D may further include optical couplers (not shown in FIGS. 4A-4D) to optically couple the ICs 416.

As shown in FIGS. 4A and 4B (which is a view along line A-A) in FIG. 4A), the substrate 412 further includes optical waveguides 430, which are formed within the glass substrate 412 and extend from a PIC interposer 414A-414D in the central region 423 to an edge 421 thereof. The substrate 412 also includes optical waveguides 432, which provide optical coupling between individual PIC interposers 414A-414D.

The optical waveguides 430 provide optical coupling between each of the PIC interposers 414A-414D, as well as between each of the PIC interposers 414A-414D and another optical component. As shown schematically in FIGS. 4A-4D, in some examples the optical waveguides 430, 432 extend along a direction substantially parallel to a plane of the major surface 411 of the glass substrate 412. The optical waveguides 430 extend to an edge 421 of the glass substrate 412, and provide edge optical coupling of the multi-chip package 400 to another optical component such as, for example, a detector, an array of optical fibers, or another multi-chip package (not shown in FIGS. 4A-4D).

In some examples, the PIC interposers 414A-414D may optionally include optical waveguides or other components (not shown in FIGS. 4A-4D) to provide vertical optical coupling to another optical component such as, for example, a detector, an array of optical fibers, or another multi-chip package. In some examples, the PIC interposers 414A-414D may be optically coupled using edge coupling as illustrated schematically in FIGS. 2E-2F.

Figure 4D:
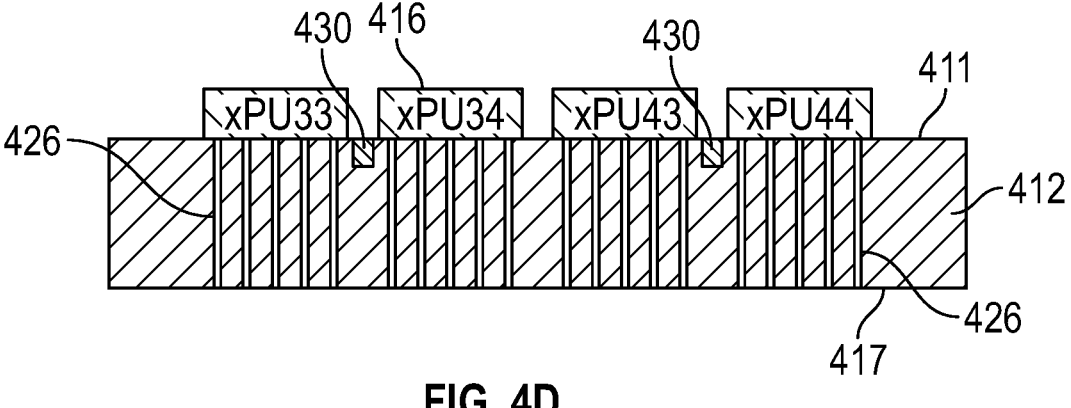
FIG. 4D is a schematic cross-sectional view of the multi-chip package of FIG. 4A taken along a line C-C of FIG. 4A.

As shown in FIG. 4C, which is a view taken along the line B-B in FIG. 3A, and FIG. 4D, which is a view taken along the line C-C in FIG. 4A, the central region 423 or the peripheral region 425 of the substrate 412 may include electrically conductive through glass vias (TGV) 426 that extend along a direction normal to a plane of the first major surface 411 and terminate at the second major surface 417. In the example of FIGS. 4A-4D, the vias 426 provide electrically conductive pathways through the substrate 412 to form electrical interconnections between the ICs 416 and another semiconductor component, circuit board, or the like. In some examples, the vias 426 include solder bumps (not shown in FIGS. 4C-4D) along the second major surface 417 of the substrate 412 to provide electrical interconnection with another electronic component.

In some examples, the glass substrate 412 may further include electrically conductive through glass vias (TGV) 428 that extend along a direction normal to a plane of the first major surface 411 and terminate at the second major surface 417. The TGVs 428 provide conductive pathways through the substrate 412 to form electrical interconnections between any or all of the PIC interposers 414A-414D and another semiconductor component, circuit board, or the like.

Figure 5:
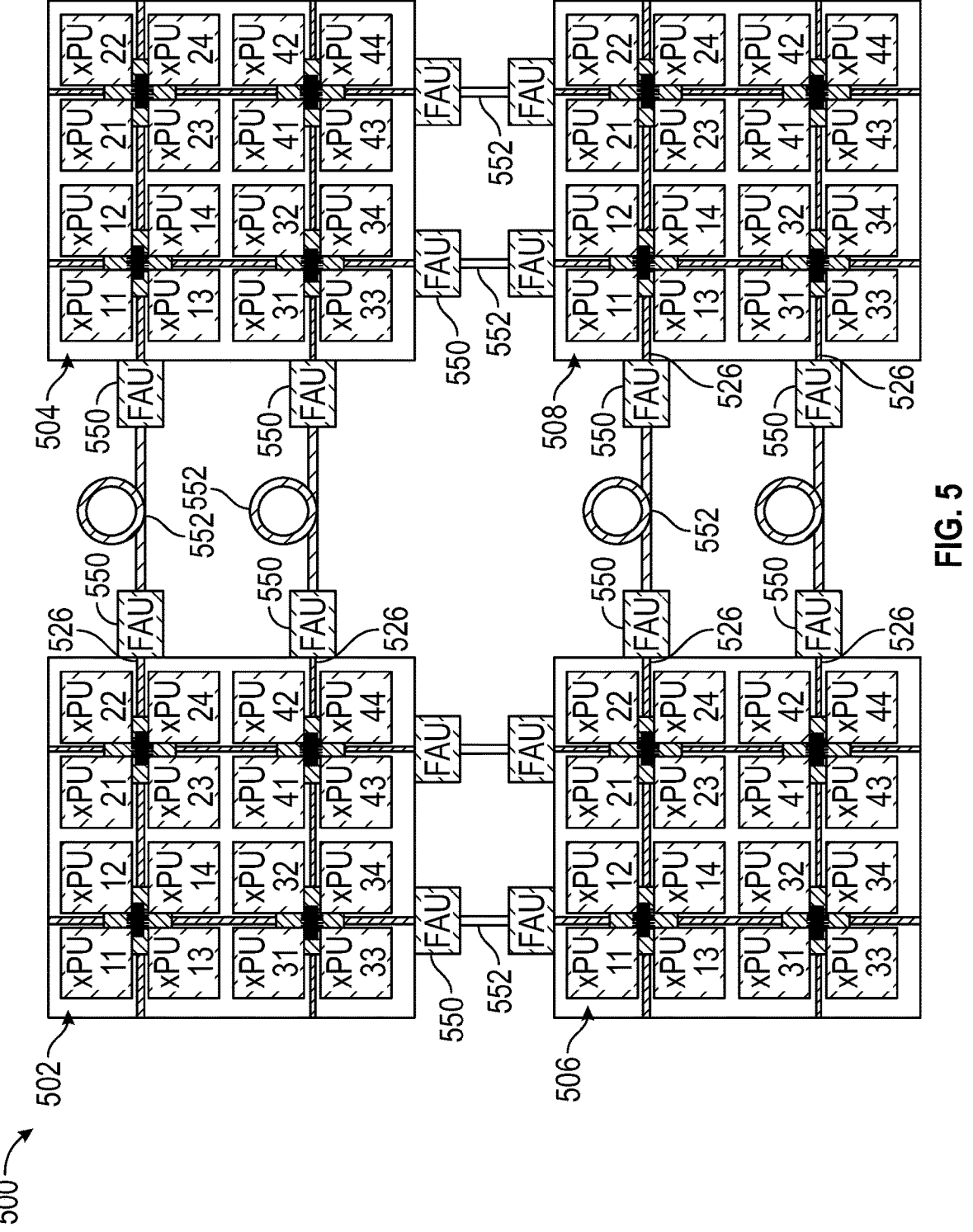
FIG. 5 is a schematic overhead view of a system including multiple multi-chip packages of FIG. 4A optically coupled with optical fibers.
Figures 6A, 6B, 6C, 6D:
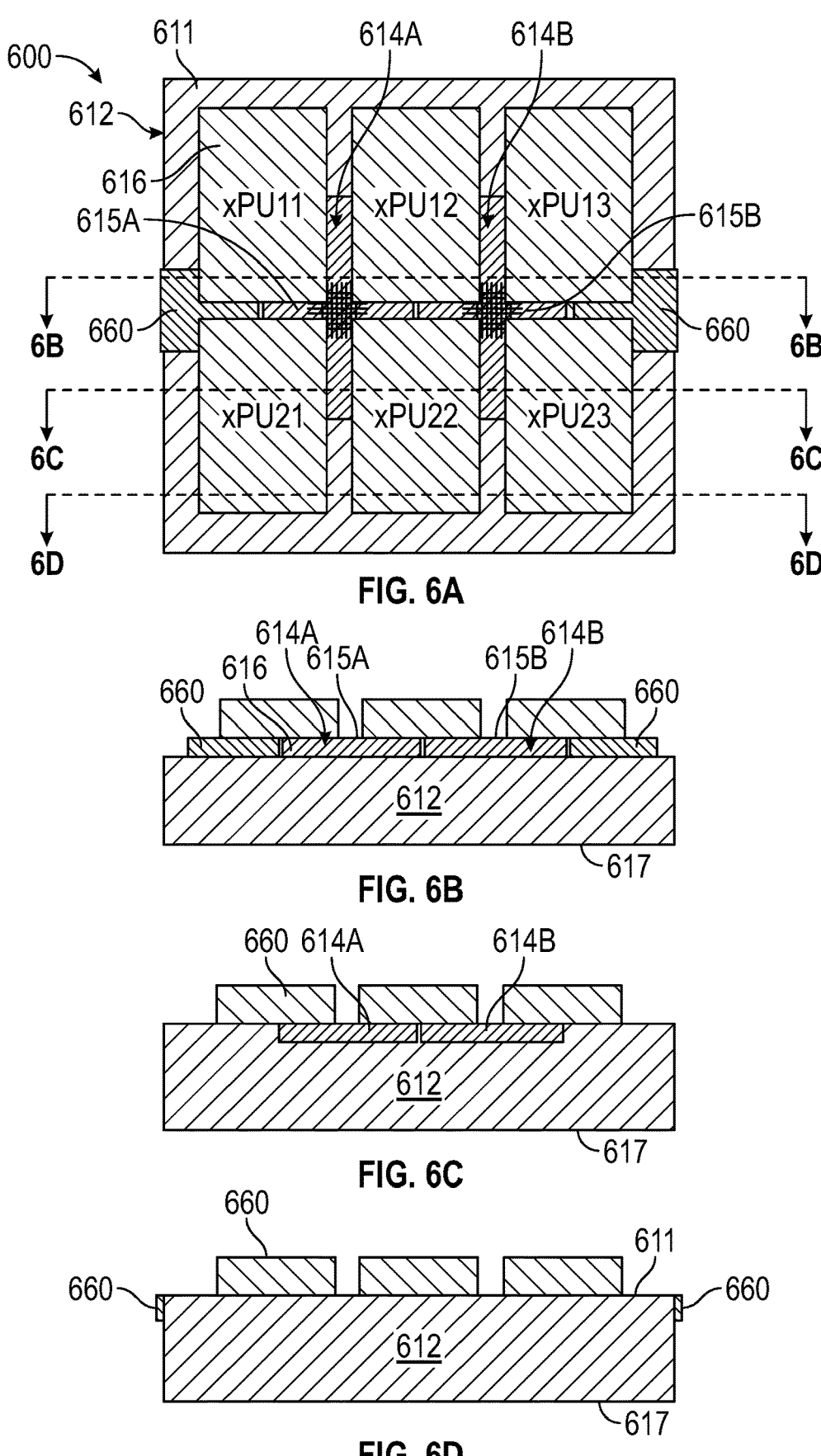
FIG. 6A is a schematic, overhead view of a multi-chip package on an organic substrate including multiple PIC interposers each overlain by portions of multiple ICs in a 2×3 array.
FIG. 6B is a schematic cross-sectional view of the multi-chip package of FIG. 6A taken along a line A-A of FIG. 6A.
FIG. 6C is a schematic cross-sectional view of the multi-chip package of FIG. 6A taken along a line B-B of FIG. 6A.
FIG. 6D is a schematic cross-sectional view of the multi-chip package of FIG. 6A taken along a line C-C of FIG. 6A.
Figure 7A:
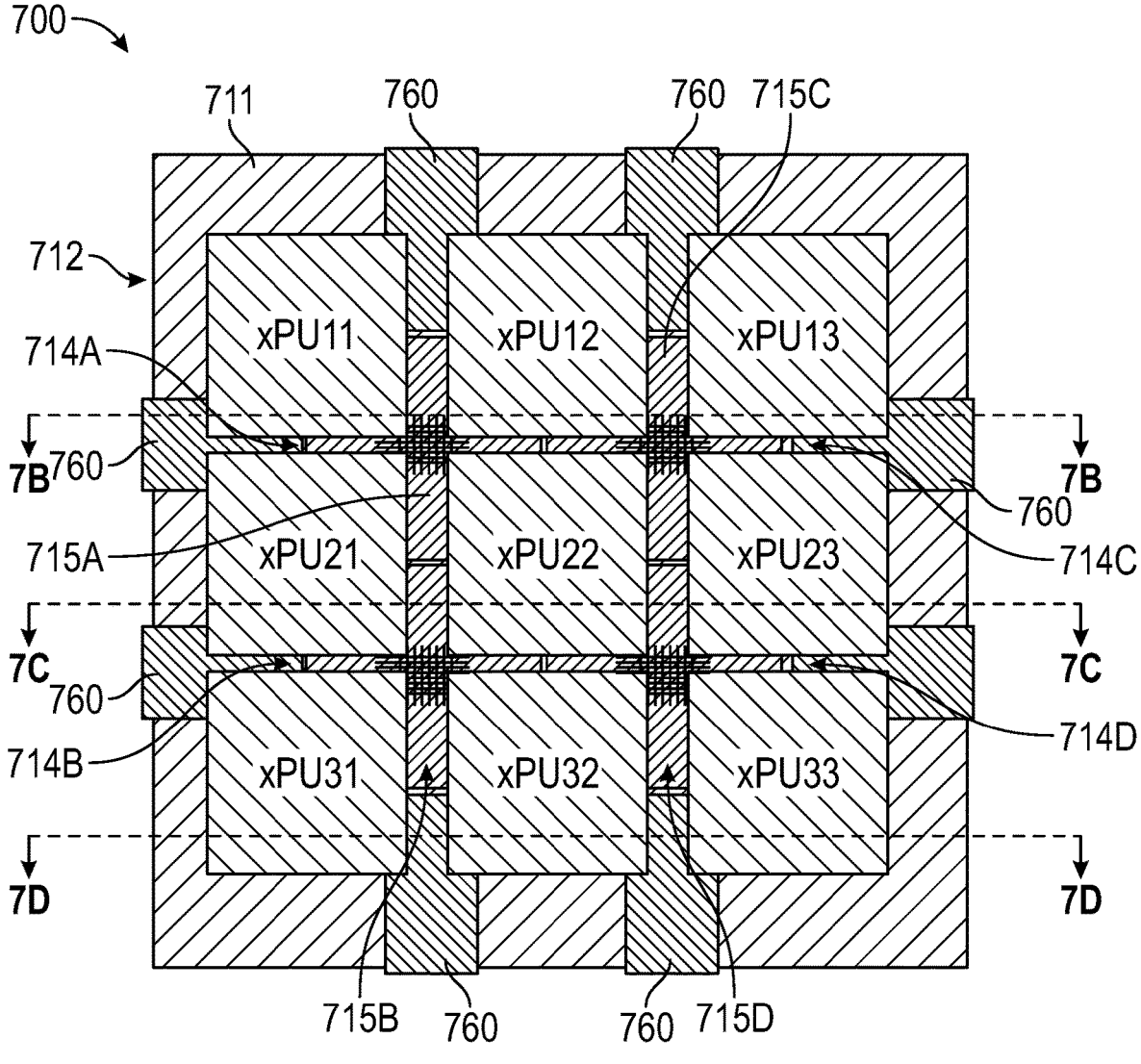
FIG. 7A is a schematic, overhead view of a multi-chip package on an organic substrate including multiple PIC interposers each overlain by portions of multiple ICs in a 3×3 array.
Figure 7B:
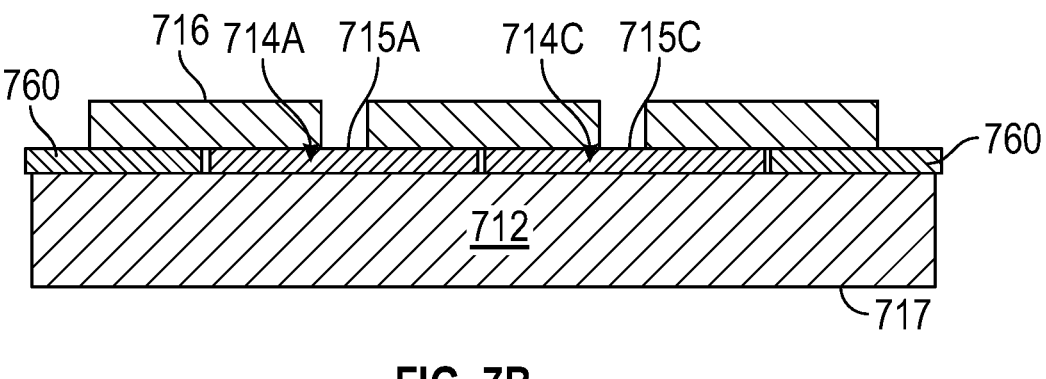
FIG. 7B is a schematic cross-sectional view of the multi-chip package of FIG. 7A taken along a line A-A of FIG. 7A.
Figure 7C:
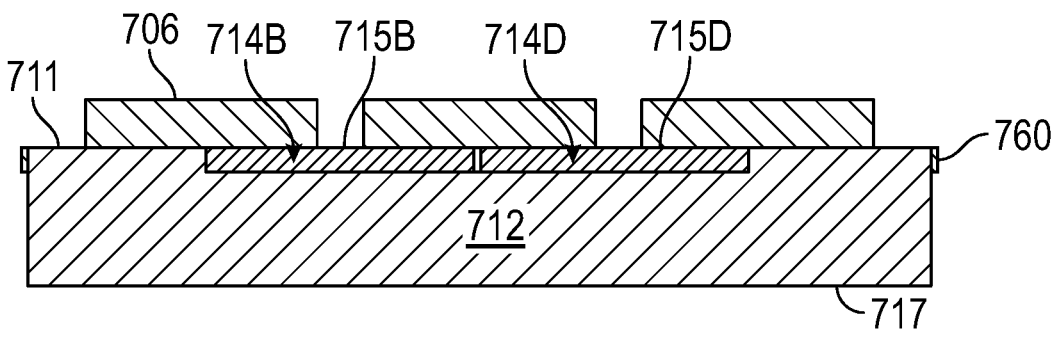
FIG. 7C is a schematic cross-sectional view of the multi-chip package of FIG. 7A taken along a line B-B of FIG. 7A.
Figure 7D:
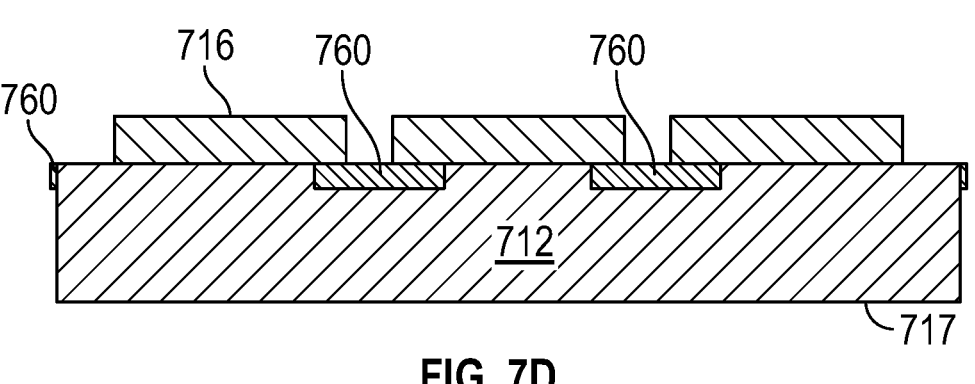
FIG. 7D is a schematic cross-sectional view of the multi-chip package of FIG. 6A taken along a line C-C of FIG. 7A.

FIG. 5 is a schematic representation of an example system 500 including four of the multi-chip packages 400 shown in FIGS. 4A-4D. As shown in FIG. 5, the system 500 includes multi-chip packages 502, 504, 506 and 508. The multi-chip packages 502-508 each include optical waveguides 526, and each of the optical waveguides 526 is optically coupled to optical fiber array units (FAU) 550. The optical fiber array units 550 are optically coupled to optical fibers 552, which are configured to transmit optical data outside each of the multi-chip packages 502-508 to another multi-chip package, to a detector, to another electronic component, or the like.

FIGS. 6A-6D show another example of a multi-chip package 600 including a 2×3 tiled arrangement of ICs. The multi-chip package 600 includes an organic substrate 612 with a first major surface 611 having mounted thereon two PIC interposers 614A, 614B. The PIC interposer 614A is electrically connected via flip chip bonding to four ICs 616 (xPU11, xPU21, xPU12 and xPU22), while PIC interposer 614B is electrically connected via flip chip bonding to four ICs 616 (xPU12, xPU13, xPU22, and xPU23). In the embodiment of FIGS. 6A-6D, the PIC interposers 614A, 614B include respective mounting surfaces 615A, 615B with solder bump arrays (not shown in FIGS. 6A-6D) configured for electrical connection to corresponding solder bumps on both ICs xPU12 and xPU22. The mounting surface 615A of the PIC interposer 614A includes solder bump arrays (not shown in FIGS. 6A-6D) configured for electrical connection to corresponding solder bumps on ICs xPU11 and xPU21. The mounting surface 615B of the PIC interposer 615B includes solder bump arrays (not shown in FIGS. 6A-6D) configured for electrical connection to ICs xPU13 and xPU23.

Optical signals are transmitted from the PIC interposers 614A, 615B to devices outside the package 600 via on-cavity PICs 660. It should be understood that, within a glass substrate, optical waveguides can also be used for optical signal transmission to other devices.

In some examples, the substrate 612 may further include electrically conductive vias (not shown in FIGS. 6A-6D) that extend along a direction normal to a plane of the first major surface 611 and terminate at the second major surface 617. The vias provide conductive pathways through the substrate 612 to form electrical interconnections between any or all of the PIC interposers 614A-614B or the ICs 616 and another semiconductor component, circuit board, or the like.

In another example, the PIC interposers 614A, 614B may optionally be optically coupled using edge couplers or other OCPICs (not shown in FIGS. 6A-6D).

FIGS. 7A-7D show another example of a multi-chip package 700 including a 3×3 tiled arrangement of ICs. The multi-chip package 700 includes an organic substrate 712 with a first major surface 711 having mounted thereon four PIC interposers 714A, 714B, 714C, 714D. The PIC interposer 714A is electrically connected via flip chip bonding to four ICs 716 (xPU11, xPU21, xPU12 and xPU22). The PIC interposer 714B is electrically connected via flip chip bonding to four ICs 716 (xPU21, xPU22, xPU31, and xPU32). The PIC interposer 714C is electrically connected via flip chip bonding to four ICs 716 (xPU12, xPU13, xPU22 and xPU23). The PIC interposer 714D is electrically connected via flip chip bonding to four ICs 716 (xPU22, xPU23, xPU32, and xPU33).

In the embodiment of FIGS. 7A-7D, the PIC interposers 714A, 714B, 714C, 714D include respective mounting surfaces 715A, 715B, 715C, 715D with solder bump arrays (not shown in FIGS. 7A-7D) configured for electrical connection to corresponding solder bumps on the respective ICs 716. The mounting surface 715A of the PIC interposer 714A includes solder bump arrays (not shown in FIGS. 7A-7D) configured for electrical connection to corresponding solder bumps on ICs xPU11, xPU12, xPU21 and xPU22. The mounting surface 715B of the PIC interposer 714B includes solder bump arrays (not shown in FIGS. 7A-7D) configured for electrical connection to ICs xPU21, xPU22, xPU31 and xPU32. The mounting surface 715C of the PIC interposer 714C includes solder bump arrays (not shown in FIGS. 7A-7D) configured for electrical connection to ICs xPU12, xPU13, xPU22 and xPU23. The mounting surface 715D of the PIC interposer 714D includes solder bump arrays (not shown in FIGS. 7A-7D) configured for electrical connection to ICs xPU22, xPU23, xPU32 and xPU33.

Optical signals are transmitted from the PIC interposers 714A, 714B, 714C, 714D to devices outside the package 700 via on-cavity PICs 760. However, it should be understood that in a glass substrate, optical waveguides within the glass can also be used for optical signal transmission to other devices.

In some examples, the substrate 712 may further include electrically conductive vias (not shown in FIGS. 7A-7D) that extend along a direction normal to a plane of the first major surface 711 and terminate at the second major surface 717. The vias provide conductive pathways through the substrate 712 to form electrical interconnections between any or all of the PIC interposers 714A-714D or the ICs 716 and another semiconductor component, circuit board, or the like.

In another example, the PIC interposers 714A-714D may optionally be optically coupled using edge couplers or other OCPICs (not shown in FIGS. 7A-7D).

The multi-chip packages described above can be utilized in a wide variety of electronic devices including, but not limited to, a desktop computer, a laptop computer, a net-book, a tablet, a notebook computer, a personal digital assistant (PDA), a server, a workstation, a cellular telephone, a mobile computing device, a smart phone, an Internet appliance, or any other type of computing device.

Figure 8:
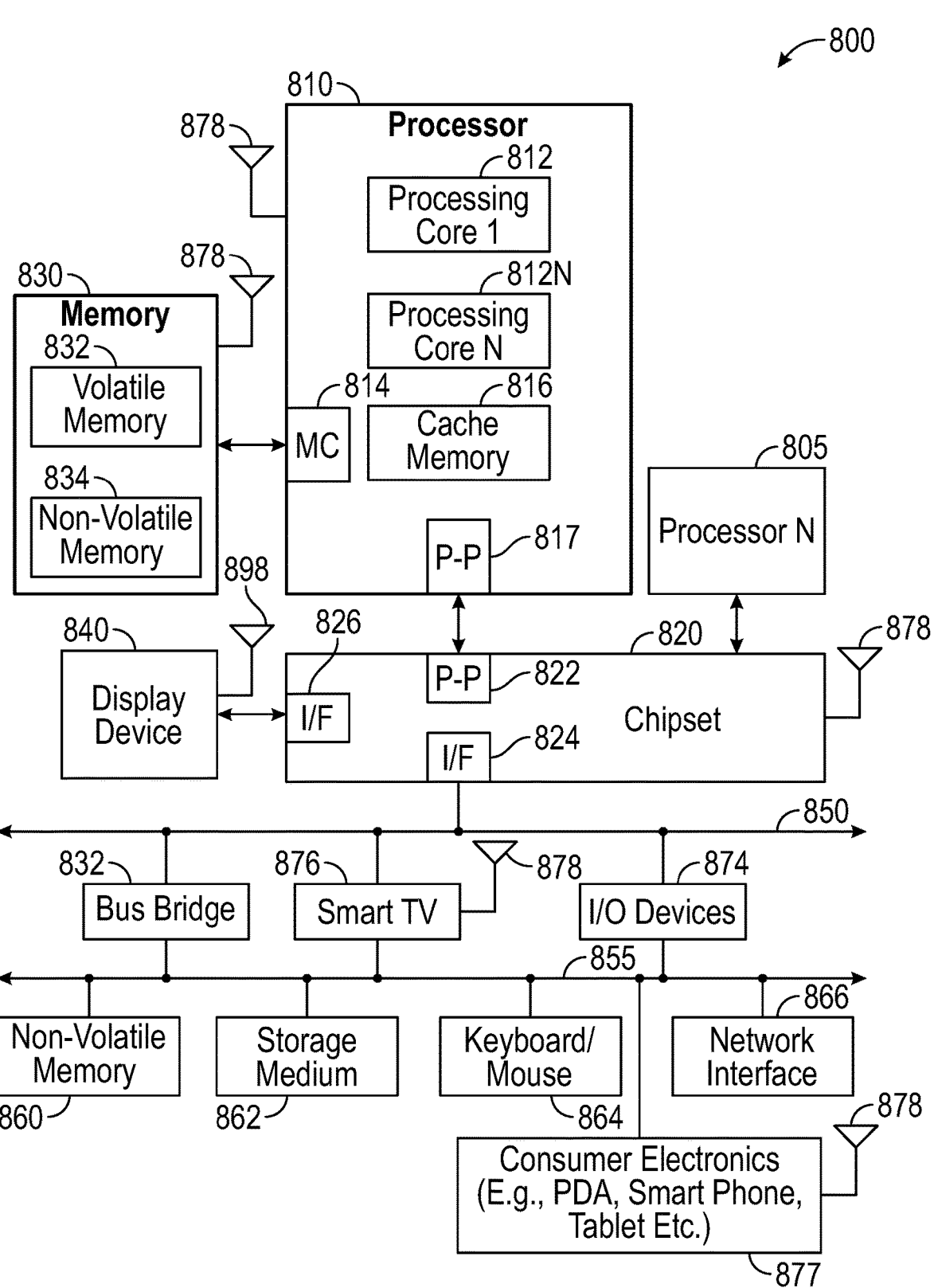
FIG. 8 shows a system that may incorporate the multi-chip packages and methods of the present disclosure, in accordance with some example embodiments.

FIG. 8 illustrates a system level diagram, depicting an example of an electronic device (e.g., system) that may include a multi-chip package or system as described above. In one embodiment, system 800 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In some embodiments, system 600 includes a system on a chip (SOC) system.

In one embodiment, processor 810 has one or more processor cores 812 and 812N, where 812N represents the Nth processor core inside processor 810 where N is a positive integer. In one embodiment, system 800 includes multiple processors including 810 and 805, where processor 805 has logic similar or identical to the logic of processor 810. In some embodiments, processing core 812 includes, but is not limited to, pre-fetch logic to fetch instructions, decode logic to decode the instructions, execution logic to execute instructions and the like. In some embodiments, processor 810 has a cache memory 816 to cache instructions and/or data for system 800. Cache memory 816 may be organized into a hierarchal structure including one or more levels of cache memory.

In some embodiments, processor 810 includes a memory controller 814, which is operable to perform functions that enable the processor 810 to access and communicate with memory 830 that includes a volatile memory 832 and/or a non-volatile memory 834. In some embodiments, processor 810 is coupled with memory 830 and chipset 820. Processor 810 may also be coupled to a wireless antenna 878 to communicate with any device configured to transmit and/or receive wireless signals. In one embodiment, an interface for wireless antenna 878 operates in accordance with, but is not limited to, the IEEE 802.11 standard and its related family, Home Plug AV (HPAV), Ultra-Wide Band (UWB), Blu-etooth, WiMax, or any form of wireless communication protocol.

In some embodiments, volatile memory 832 includes, but is not limited to, Synchronous Dynamic Random Access Memory (SDRAM), Dynamic Random Access Memory (DRAM), RAMBUS Dynamic Random Access Memory (RDRAM), and/or any other type of random-access memory device. Non-volatile memory 834 includes, but is not limited to, flash memory, phase change memory (PCM), read-only memory (ROM), electrically erasable programmable read-only memory (EEPROM), or any other type of non-volatile memory device.

Memory 830 stores information and instructions to be executed by processor 810. In one embodiment, memory 830 may also store temporary variables or other intermediate information while processor 810 is executing instructions. In the illustrated embodiment, chipset 820 connects with processor 810 via Point-to-Point (PtP or P-P) interfaces 817 and 822. Chipset 820 enables processor 810 to connect to other elements in system 600. In some embodiments of the example system, interfaces 817 and 822 operate in accordance with a PtP communication protocol such as the those available from Intel Corp., Santa Clara, CA, under the trade designation QuickPath Interconnect (QPI) or the like. In other embodiments, a different interconnect may be used.

In some embodiments, chipset 820 is operable to communicate with processor 810, 805N, display device 840, and other devices, including a bus bridge 872, a smart TV 876, I/O devices 874, nonvolatile memory 860, a storage medium (such as one or more mass storage devices) 862, a keyboard/mouse 864, a network interface 866, and various forms of consumer electronics 877 (such as a PDA, smart phone, tablet etc.), etc. In one embodiment, chipset 820 couples with these devices through an interface 824. Chipset 820 may also be coupled to a wireless antenna 878 to communicate with any device configured to transmit and/or receive wireless signals. In one example, any combination of components in a chipset may be separated by a continuous flexible shield as described in the present disclosure.

Chipset 820 connects to display device 840 via interface 826. Display 840 may be, for example, a liquid crystal display (LCD), a light emitting diode (LED) array, an organic light emitting diode (OLED) array, or any other form of visual display device. In some embodiments of the example system, processor 810 and chipset 820 are merged into a single SOC. In addition, chipset 820 connects to one or more buses 850 and 855 that interconnect various system elements, such as I/O devices 874, nonvolatile memory 860, storage medium 862, a keyboard/mouse 864, and network interface 866. Buses 850 and 855 may be interconnected together via a bus bridge 872.

In one embodiment, mass storage device 862 includes, but is not limited to, a solid-state drive, a hard disk drive, a universal serial bus flash memory drive, or any other form of computer data storage medium. In one embodiment, network interface 866 is implemented by any type of well-known network interface standard including, but not limited to, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the IEEE 802.11 standard and its related family, Home Plug AV (HPAV), Ultra-Wide Band (UWB), Bluetooth, WiMax, or any form of wireless communication protocol.

While the modules shown in FIG. 8 are depicted as separate blocks within the system 800, the functions performed by some of these blocks may be integrated within a single semiconductor circuit or may be implemented using two or more separate integrated circuits. For example, although cache memory 816 is depicted as a separate block within processor 810, cache memory 816 (or selected aspects of 816) can be incorporated into processor core 812.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described to best explain the principles involved and their practical applications, to thereby enable others skilled in the art to best utilize the various example embodiments with various modifications as are suited to the particular use contemplated.

It will also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for the purpose of describing particular example embodiments only and is not intended to be limiting. As used in the description of the example embodiments and the appended examples, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

EXAMPLES

Example A. A substrate for a multi-chip package, the substrate comprising:
 a first major surface and an opposed second major surface;
 at least one photonic integrated circuit (PIC) interposer mounted in a cavity in the first major surface of the substrate, wherein each PIC interposer is configured to electrically connect with, or optically couple to, a plurality of integrated circuit devices; and
 at least one optical coupler in the substrate, wherein the at least one optical coupler is optically coupled to the at least one PIC interposer.

Example B. The substrate of Example A, wherein the substrate further comprises at least one electrically conductive via extending along a direction substantially normal to a plane of the first major surface of the substrate.

Example C. The substrate of Examples A or B, wherein the substrate comprises glass, and the optical coupler comprises an optical waveguide in the substrate.

Example D. The substrate of any of Examples A to C, wherein the substrate comprises an organic material, and the optical coupler comprises an on-cavity PIC (OCPIC).

Example E. The substrate of any of Examples A to D, wherein the substrate comprises a plurality of PIC interposers, and adjacent PIC interposers are optically coupled via edge couplers.

Example F. The substrate of any of Examples A to E, wherein the PIC interposer comprises a mounting surface configured to mount thereon the plurality of integrated circuit devices.

Example G. The substrate of Example F, wherein the first major surface of the substrate comprises a mounting surface configured to mount the plurality of integrated circuit devices, and a portion of at least four different integrated circuit devices overlies each PIC interposer.

Example H. The substrate of Example G, wherein each PIC interposer comprises a first array of solder bumps configured to attach to a first corresponding array of solder bumps on a first device, a second array of solder bumps configured to attach to a second corresponding array of solder bumps on a second device, a third array of solder bumps configured to attach to a third corresponding array of solder bumps on a third device, and a fourth array of solder bumps configured to attach to a fourth corresponding array of solder bumps on a fourth device.

Example I. The substrate of any of Examples A to H, wherein the substrate comprises a plurality of PIC interposers, each PIC interposer in the plurality of interposers being mounted in a cavity in the first major surface of the substrate.

Example J. The substrate of Example I, wherein the substrate comprises a plurality of optical waveguides optically coupling the plurality of PIC interposers, the optical waveguides extending along a direction substantially parallel to the plane of the first major surface of the substrate.

Example K. The substrate of Example J, wherein at least a portion of the PIC interposers in the plurality of PIC interposers are optically coupled to another PIC interposer via edge coupling.

Example L. The substrate of any of Examples A to K, wherein the first major surface of the substrate comprises a central cavity having mounted therein a single PIC interposer, and a plurality of electrically conductive vias in a peripheral region of the substrate outboard of the central cavity, the vias extending along a direction substantially normal to a plane of the first major surface of the substrate.

Example M. The substrate of any of Examples A to L, wherein the substrate comprises a central region comprising a plurality of cavities each housing a PIC interposer in the plurality of PIC interposers, and a peripheral region outboard of the central region, wherein the peripheral region comprises a plurality of vias extending along a direction substantially normal to a plane of the first major surface of the substrate.

Example N. The substrate of any of Examples A to M, wherein the second major surface of the substrate comprises an array of solder bumps configured for mounting the substrate to an electronic component.

Example O. A mounting substrate for a multi-chip package, the substrate comprising:
 a first major surface and an opposed second major surface, wherein the first major surface of the substrate comprises a plurality of cavities;
 at least one PIC interposer in each cavity of the plurality of cavities, wherein each PIC interposer is configured to electrically connect to or optically couple with at least four integrated circuit devices; and
 a plurality of optical couplers each extending along a direction substantially parallel to a plane of the major surface of the substrate, and wherein the plurality of optical couplers optically interconnect the PIC interposers in the plurality of cavities.

Example P. The mounting substrate of Example O, wherein the optical couplers are chosen from on-cavity PICs (OCPIC), optical waveguides, and edge couplers.

Example Q. The mounting substrate of Example P, wherein the substrate comprises glass, and the optical interconnects comprise optical waveguides in the substrate.

Example R. The mounting substrate of Example Q, wherein at least some of the optical waveguides terminate at an edge of the substrate to provide optical coupling to another multi-chip package.

Example S. A system, comprising:
 a plurality of multi-chip packages, wherein each multi-chip package comprises:
  a glass substrate having a first major surface and an opposed second major surface, wherein the first major surface of the substrate comprises a plurality of cavities;
  at least one PIC interposer in each cavity of the plurality of cavities;
  a plurality of integrated circuit devices mounted on the first major surface of the substrate, wherein each PIC interposer is electrically connected with, or optically coupled to, at least four integrated circuit devices;

optical couplers optically coupling the PIC interposers, wherein at least a portion of the optical couplers have an output at an edge of the substrate; and a plurality of electrically conductive vias extending through the substrate along a direction substantially normal to the plane of the first major surface of the substrate; and optical fibers optically coupled to the output of the optical couplers to transmit optical data between the plurality of multi-chip packages.

Example T. The system of Example S, wherein the plurality of PIC interposers are mounted in a central region of the substrate, and at least some of the electrically conductive vias are in a peripheral region of the substrate outboard of the central region.

Example U. The system of Examples S to T, wherein the optical couplers each comprise optical waveguides in the substrate.

Example V. The system of any of Examples S to U, wherein a first PIC interposer in a first multi-chip package is optically coupled to a second PIC interposer in a second multi-chip package via a grating coupler.

We claim:

1. A substrate for a multi-chip package, the substrate comprising:

a first major surface and an opposed second major surface;

at least one photonic integrated circuit (PIC) interposer mounted in a cavity in the first major surface of the substrate, wherein each PIC interposer is configured to electrically connect with, or optically couple to, a plurality of integrated circuit devices;

at least one optical coupler in the substrate, wherein the at least one optical coupler is optically coupled to the at least one PIC interposer;

a central region comprising a plurality of cavities each housing a PIC interposer in the plurality of PIC interposers; and a peripheral region outboard of the central region, wherein the peripheral region comprises a plurality of vias extending along a direction substantially normal to a plane of the first major surface of the substrate.

2. The substrate of claim 1, wherein the substrate comprises glass, and the optical coupler comprises an optical waveguide in the substrate.

3. The substrate of claim 1, wherein the substrate comprises an organic material, and the optical coupler comprises an on-cavity PIC (OCPIC).

4. The substrate of claim 1, wherein the substrate comprises a plurality of PIC interposers, and adjacent PIC interposers in the plurality of PIC interposers are optically coupled via edge couplers.

5. The substrate of claim 1, wherein each PIC interposer comprises a mounting surface configured to mount thereon a plurality of integrated circuit devices.

6. The substrate of claim 1, wherein the substrate comprises a plurality of optical waveguides optically coupling the plurality of PIC interposers, the optical waveguides extending along a direction substantially parallel to the plane of the first major surface of the substrate.

7. The substrate of claim 1, wherein the second major surface of the substrate comprises an array of solder bumps configured for mounting the substrate to an electronic component.

8. A mounting substrate for a multi-chip package, the substrate comprising:

a first major surface and an opposed second major surface, wherein the first major surface of the substrate comprises a plurality of cavities;

at least one PIC interposer in each cavity of the plurality of cavities, wherein each PIC interposer is configured to electrically connect to or optically couple with at least four integrated circuit devices; and a plurality of optical couplers each extending along a direction substantially parallel to a plane of the first major surface of the substrate, and wherein the plurality of optical couplers optically interconnect the PIC interposers in the plurality of cavities, wherein the substrate comprises glass, and the optical couplers comprise optical waveguides in the substrate.

9. The mounting substrate of claim 8, wherein the optical couplers are chosen from on-cavity PICs (OCPIC), optical waveguides, and edge couplers.

10. The mounting substrate of claim 8, wherein at least some of the optical waveguides terminate at an edge of the substrate to provide optical coupling to another multi-chip package.

11. A system, comprising:

a plurality of multi-chip packages, wherein each multi-chip package comprises:

a glass substrate having a first major surface and an opposed second major surface, wherein the first major surface of the substrate comprises a plurality of cavities;

at least one PIC interposer in each cavity of the plurality of cavities;

a plurality of integrated circuit devices mounted on the first major surface of the substrate, wherein each PIC interposer is electrically connected with, or optically coupled to, at least four integrated circuit devices;

optical couplers optically coupling the PIC interposers, wherein at least a portion of the optical couplers have an output at an edge of the substrate; and a plurality of electrically conductive vias extending through the substrate along a direction substantially normal to a plane of the first major surface of the substrate; and optical fibers optically coupled to the output of the optical couplers to transmit optical data between the plurality of multi-chip packages.

12. The system of claim 11, wherein the plurality of PIC interposers are mounted in a central region of the substrate, and at least some of the electrically conductive vias are in a peripheral region of the substrate outboard of the central region.

13. The system of claim 11, wherein the optical couplers each comprise optical waveguides in the substrate.

14. The system of claim 11, wherein a first PIC interposer in a first multi-chip package is optically coupled to a second PIC interposer in a second multi-chip package via vertical optical coupling.

* * * * *